United States Patent
Boudikian et al.

(10) Patent No.: US 11,290,012 B2
(45) Date of Patent: Mar. 29, 2022

(54) CONVERTER WITH SELECTABLE OUTPUT-VOLTAGE RANGES

(71) Applicant: VALEO VISION, Bobigny (FR)

(72) Inventors: David Boudikian, Bobigny (FR);
Jean-Philippe Alves, Bobigny (FR);
Irantzu Jauregi, Bobigny (FR);
Jintao-Lita Liang, Foshan (CN)

(73) Assignee: VALEO VISION, Bobigny (FR)

(*) Notice: Subject to any disclaimer, the term of this patent is extended or adjusted under 35 U.S.C. 154(b) by 0 days.

(21) Appl. No.: 16/615,336

(22) PCT Filed: May 18, 2018

(86) PCT No.: PCT/EP2018/063201
§ 371 (c)(1),
(2) Date: Nov. 20, 2019

(87) PCT Pub. No.: WO2018/215368
PCT Pub. Date: Nov. 29, 2018

(65) Prior Publication Data
US 2020/0186034 A1    Jun. 11, 2020

(30) Foreign Application Priority Data
May 22, 2017 (FR) ...................................... 1754514

(51) Int. Cl.
*H02M 3/158*      (2006.01)
*H02M 3/155*      (2006.01)

(52) U.S. Cl.
CPC .......... *H02M 3/158* (2013.01); *H02M 3/1557* (2021.05)

(58) Field of Classification Search
CPC ......... H02M 3/155; H02M 2003/1552; H02M 2003/1557; H02M 3/1558; H02M 3/158; H02M 3/1582
See application file for complete search history.

(56) References Cited

U.S. PATENT DOCUMENTS 5,781,000 A    7/1998  Saeki et al.
7,372,239 B2*  5/2008  Kumagai .............. H02M 3/158
                                                323/206

(Continued)

FOREIGN PATENT DOCUMENTS

CN    1418395 A         5/2003
EP    3214899 A1 *      9/2017 ........... H05B 45/395

(Continued)

OTHER PUBLICATIONS

International Search Report dated Jun. 14, 2018 in corresponding PCT/EP2018/063201 filed on May 18, 2018, 3 pages.

(Continued)

*Primary Examiner* — Matthew V Nguyen
(74) *Attorney, Agent, or Firm* — Oblon, McClelland, Maier & Neustadt, L.L.P.

(57) ABSTRACT

A converter that makes it possible to selectively switch between various converter architectures that are capable of supplying different output voltages on the basis of one and the same input voltage. The various architectures share at least some electronic components with one another, thereby decreasing the production cost of the converter according to the invention. The converter is particularly advantageous for lighting modules for motor vehicles, in which there are substantial space constraints but in which wide output-voltage ranges are required to be able to supply a varied and substantial number of electroluminescent light sources (LEDs) with power.

20 Claims, 2 Drawing Sheets

(56) References Cited

U.S. PATENT DOCUMENTS

| | | | |
|---|---|---|---|
| 7,863,880 | B1 | 1/2011 | Sutardja et al. |
| 2004/0008016 | A1 | 1/2004 | Sutardja et al. |
| 2004/0155640 | A1 | 8/2004 | Sutardja et al. |
| 2004/0018351 | A1 | 9/2004 | Sutardja et al. |
| 2004/0178785 | A1 | 9/2004 | Sutardja et al. |
| 2004/0196015 | A1 | 10/2004 | Sutardja et al. |
| 2004/0196016 | A1 | 10/2004 | Sutardja et al. |
| 2004/0196017 | A1 | 10/2004 | Sutardja et al. |
| 2004/0196018 | A1 | 10/2004 | Sutardja et al. |
| 2004/0239300 | A1 | 12/2004 | Sutardja et al. |
| 2005/0156581 | A1 | 7/2005 | Sutardja et al. |
| 2006/0022657 | A1 | 2/2006 | Sutardja et al. |
| 2006/0033482 | A1* | 2/2006 | Florence ............... H05B 45/48 323/267 |
| 2006/0113977 | A1 | 6/2006 | Riehl |
| 2008/0030176 | A1 | 2/2008 | Sutardja et al. |
| 2008/0030182 | A1 | 2/2008 | Sutardja et al. |
| 2008/0186014 | A1 | 8/2008 | Sutardja et al. |
| 2012/0139516 | A1* | 6/2012 | Tsai ..................... H02M 3/158 323/282 |
| 2016/0241299 | A1* | 8/2016 | Ripley ................. H02M 3/158 |
| 2017/0331368 | A1* | 11/2017 | Koniakowsky ....... H02M 3/155 |
| 2019/0172379 | A1* | 6/2019 | Park ..................... H02M 3/158 |

FOREIGN PATENT DOCUMENTS

| | | | |
|---|---|---|---|
| WO | WO 2004/006037 A2 | 1/2004 | |
| WO | WO 2006/053104 A2 | 5/2006 | |
| WO | WO-2016131034 A2 * | 8/2016 | ............ H02M 3/158 |

OTHER PUBLICATIONS

Combined Chinese Office Action and Search Report dated Nov. 30, 2020 in corresponding Chinese Patent Application No. 201880033773.6 (with English Translation), 11 pages.

Priscila Facco de Melo, et al., "A Soft-Switching Universal-Input Voltage HPF Reclifier Implemented with a Modified SEPIC Converter", 2009 Brazilian Power Electronics Conference, Dec. 2009, 2 pages.

European Office Action dated Aug. 27, 2021 in European Patent Application No. 18 724 268.0, 2 pages.

Bianchin et al., Carlos Gabriel; High-Power-Factor Rectifier Using the Modified SEPIC Converter Operating in Discontinuous Conduction Mode, IEEE Transactions on Power Electronics, vol. 30, No. 8, Aug. 2015, pp. 4349-4364 (16 pages).

* cited by examiner

CONVERTER WITH SELECTABLE OUTPUT-VOLTAGE RANGES

The invention relates to electrical converters. In particular, the invention relates to a converter that is capable of generating output voltages over a wide range of values, which is advantageous in particular in the context of lighting modules for motor vehicles incorporating a plurality of light sources, for example light-emitting diodes (LEDs).

It is becoming increasingly common to use semiconductor element-based light sources, such as light-emitting diodes (LEDs), to perform various lighting functions of a motor vehicle. These functions may, for example, include daytime running lights, position lights, turn indicators or low beam lights. As is known, a device for driving the electrical power supply is needed to supply power to a group of LEDs performing a given lighting function. Such a driver device generally comprises a voltage converter that, on the basis of a DC input voltage delivered by a source that is internal to the vehicle, such as a battery, is capable of generating an output voltage having a value that is suitable for supplying power to the group of LEDs. An LED emits light when a voltage that is at least equal to a threshold value, referred to as forward voltage, is applied to its terminals. The intensity of the luminous flux emitted by an LED generally increases with the average intensity of the electric current flowing therethrough, above the threshold value for the direct current.

Known converter types comprise SEPIC (single-ended primary-inductor converter), flyback, boost and buck converters. Such converters involve a switch element, such as a transistor, the state of which is periodically switched between the open and closed values. The closure duty cycle D applied to the switch affects the value of the output voltage and the average value of the output current. For the example of a SEPIC, the output voltage $V_{OUT}$ is equal to $V_{IN}$ multiplied by the ratio $D/(1-D)$.

The input voltage $V_{IN}$ for such converters within a motor vehicle, which constitutes a closed and autonomous system, is typically limited to between 6 V and 20 V. This implies intrinsic limitations with regard to the output voltage values that are achievable using known converter architectures. In the example of a SEPIC, for a minimum voltage of 6 V at input and a duty cycle $D_{max}$ of 0.9, the maximum output voltage for supplying light sources with power has an upper limit of 54 V. Similarly, for a maximum voltage of 20 V at input and a duty cycle $D_{min}$ of 0.2, the minimum output voltage of the converter has a lower limit of 5 V.

However, to produce increasingly complex lighting functions or particular optical signatures, it becomes necessary to supply a substantial number of LEDs with power, which number may be variable depending on the lighting function that is active, using the same driver means. The forward voltage values required within lighting modules for motor vehicles in order to guarantee that the LEDs involved are supplied with power may exceed the range of output voltages available using the converter architectures that are known in the art.

An object of the invention is to overcome at least one of the problems posed by the prior art. More specifically, one object of the invention is to provide a converter that is able to selectively supply output voltage values which exceed the output voltage values that are achievable using known converter architectures.

One subject of the invention is a converter for selectively converting an input voltage into at least a first and a second different output voltages. The converter is noteworthy in that it comprises a selector assembly that makes it possible to switch between using a first and at least a second electronic circuit, the first and second electronic circuits allowing the first and second output voltages to be supplied, respectively. The second electronic circuit comprises at least a portion of the first electronic circuit.

Preferably, the second electronic circuit may comprise the first electronic circuit.

The selector assembly may preferably comprise at least one switch. The switch may preferably comprise a transistor, for example a field-effect transistor (MOSFET, for metal-oxide-semiconductor field-effect transistor).

Preferably, the first electronic circuit may be a SEPIC (single-ended primary-inductor converter) circuit and the second electronic circuit may be a boosted-SEPIC circuit.

Preferably, the first electronic circuit may comprise an input terminal, a first inductor L connecting the input terminal to a first node N1, a first capacitor C1, the terminals of which connect the first node N1 to a second node N2, a first diode D1, the anode of which is connected to the second node N2 and the cathode of which is connected to a third node, the third node being connected to an output terminal of the converter. The first electrical circuit may further comprise a first switch Q1 that connects the first node N1 to ground, a second inductor L2 that connects the node N2 to ground, and a second capacitor C2 that connects the third node N3 to ground.

The first switch Q1 may preferably be a transistor, in particular a field-effect transistor, the closure duty cycle of which has an effect on the value of the output voltage of the converter.

Preferably, the second electronic circuit may comprise the first electronic circuit and may further comprise a fourth node N4 that is located between the second inductor L2 and ground, a second diode D2, the anode of which is connected to the first node N1 and the cathode of which is connected to the fourth node N4, and a third capacitor C3 connecting the node N4 to ground.

The selector assembly may preferably be capable of selectively connecting and disconnecting the second diode D2 and the third capacitor C3.

Preferably, the selector assembly may comprise a first selector switch that is arranged between the first node and the anode of the second diode D2, and a second selector switch that is connected in parallel with the third capacitor C3 and connects the node N4 to ground.

The first electronic circuit may preferably be capable of generating an output voltage of between 5 and 55 V and the second electronic circuit may preferably be capable of generating an output voltage of between 30 and 114 V for an input voltage of between 6 and 20 V.

Another subject of the invention is a device for driving the power supply for at least one semiconductor element-based light source. The driver device is noteworthy in that it comprises a converter according to the present invention and a control unit that is configured to control the selector assembly of the converter according to the voltage level required to supply the light sources with power.

Preferably, the light sources may comprise light-emitting diodes (LEDs).

The control unit of the driver device may preferably comprise a microcontroller element.

If the converter comprises a switch whose closure duty cycle has an effect on the value of the output voltage of the converter, the control unit may further be configured to impose a duty cycle on said switch.

Another object of the invention is to provide a motor vehicle comprising at least one lighting module, the lighting module comprising a device for driving the power supply for at least one semiconductor element-based light source. The motor vehicle is noteworthy in that the driver device for driving the power supply for the light sources is in accordance with the driver device according to the present invention.

By using the measures proposed by the present invention, it becomes possible to provide a converter that is capable of selectively producing output voltage values over a range of voltages exceeding those that are achievable using known converter architectures. The device according to the invention makes it possible to switch between at least two electronic circuits, each of the electronic circuits forming a converter circuit. The electronic circuits share at least some of their constituent electronic components with one another. In this way, the invention allows production costs to be decreased with respect to using a plurality of completely separate converters to produce a plurality of output voltage ranges. This also results in a decrease in the space needed for the converter according to the invention in comparison with using dedicated converters to achieve equivalent functionality. In one preferred embodiment of the invention, a converter incorporates a SEPIC architecture and a boosted-SEPIC architecture, comprising all of the electronic components of the SEPIC architecture. In boosted-SEPIC mode, the converter is in particular capable of producing output voltages ranging from 30 V to 114 V, this second value being for example produced for an input voltage of 6 V and a closure duty cycle of 0.9. In SEPIC mode, the converter allows output voltages of between 5 V and 54 V to be produced. Through the use of the invention, a range of values from 5 V to 114 V therefore becomes available from input voltage values that are typically available within a motor vehicle. This increases flexibility in the design of lighting modules for motor vehicles, in particular lighting modules carrying out a plurality of lighting functions by means of a plurality of LED light sources. The number of LEDs that may be driven by one and the same driver device incorporating the converter according to the invention is in particular increased with respect to inexpensive and straightforwardly produced single-converter solutions known from the art.

Other features and advantages of the present invention will be better understood with the aid of the exemplary description and the drawings, in which:

FIG. 1 schematically shows a converter according to one preferred embodiment of the invention;

Figure 5:
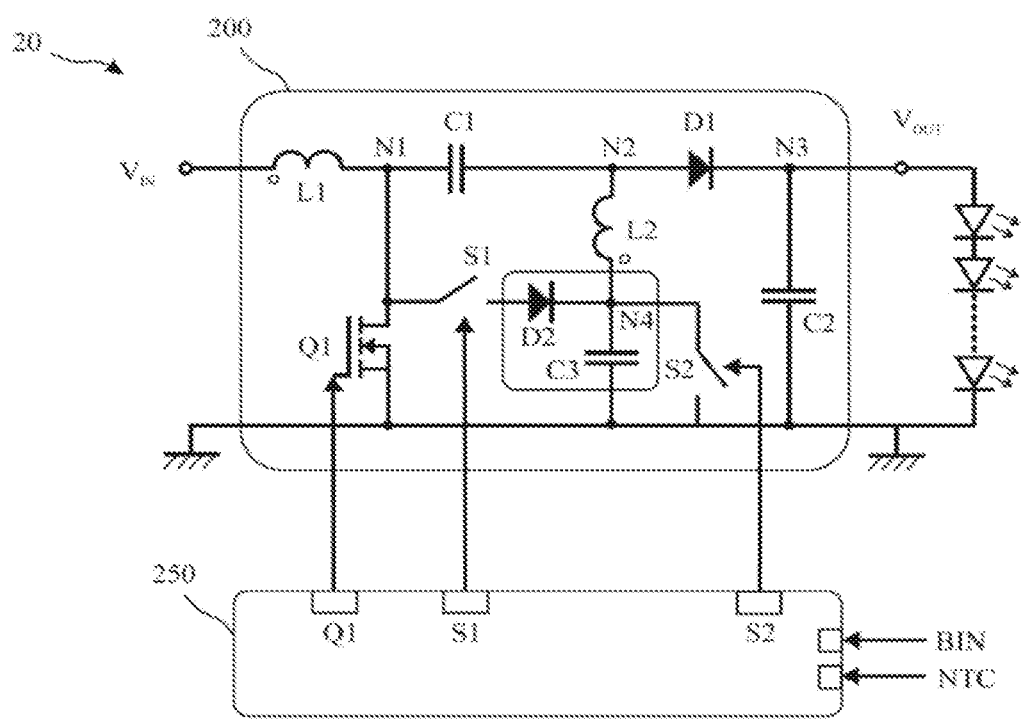

FIG. 5 schematically shows a device for supplying a plurality of LED light sources with power according to one preferred embodiment of the invention.

Unless specified otherwise, technical features that are described in detail for one given embodiment may be combined with the technical features that are described in the context of other embodiments described by way of non-limiting example. Similar reference numerals will be used to describe similar concepts across various embodiments of the invention. For example, the references 100 and 200 denote two embodiments of a converter according to the invention.

Figure 1:
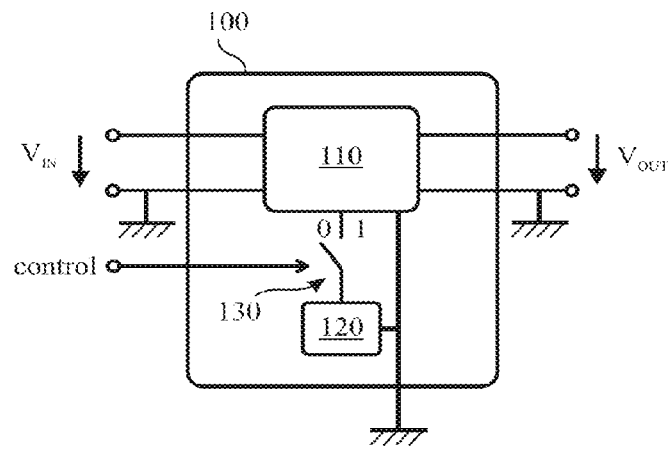

The diagram in FIG. 1 shows a converter 100 according to a first embodiment of the invention. The converter comprises a first electronic circuit 110 which forms a first converter circuit capable of converting the input voltage $V_{IN}$ into an output voltage $V_{OUT}(110)$, which differs from $V_{IN}$. The first electronic circuit 110 comprises an assembly of a first set of electronic components. The converter 100 also comprises a second set of electronic components 120 and a selector assembly 130, which is illustrated schematically as a single switch controlled by the signal "control". When the control signal is equal to 0, the switch of the selector assembly 130 is open and the converter 100 is capable of supplying the output voltage $V_{OUT}(110)$, as described above. When the control signal is equal to 1, the switch of the selector assembly 130 is closed. In this case, the operation of combining of the first electronic circuit 110 with the electronic components 120 forms a second converter circuit, different from the circuit 110, which is capable of converting the input voltage $V_{IN}$ into an output voltage $V_{OUT}(110, 120)$, which differs from $V_{IN}$. When being connected together, the electronic components from the second set of electronic components 120 are functionally incorporated at precise and predetermined sites in the circuit diagram of the first circuit 110. Optionally, one or more electronic components forming part of the assembly of the first electronic circuit may be disconnected in a predetermined manner when the operation of combining the first electronic circuit with the electronic components 120 is activated by means of the selector switch 130. It goes without saying that the same principle of combining electronic components/circuits may be extended to a greater number of electronic circuits without however departing from the scope of the present invention. In this way, the selector assembly 130 will make it possible to choose between a greater number of converter circuits that are capable of generating a plurality of output voltages or ranges of output voltages.

Figure 2:
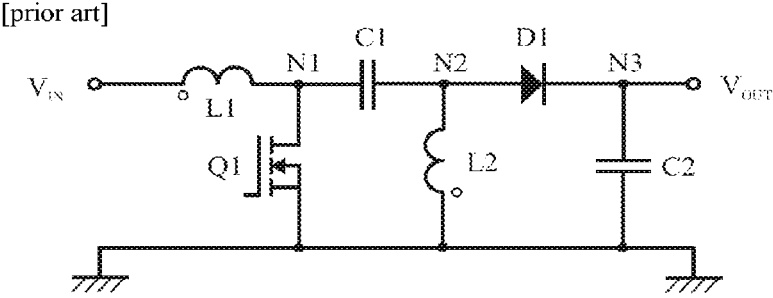
FIG. 2 shows a circuit diagram of a SEPIC known from the prior art.

FIG. 2 illustrates the circuit diagram of a SEPIC-type switched-mode converter known per se in the art. The corresponding electronic circuit comprises an input terminal to which an input voltage $V_{IN}$ is applied. A first inductor L1 connect the input terminal to a first node N1. The terminals of a first capacitor C1 connect the first node N1 to a second node N2. The electronic circuit comprises a first diode D1, the anode of which is connected to the second node N2 and the cathode of which is connected to a third node, the third node being connected to an output terminal of the converter. A first switch Q1, illustrated as a transistor by way of example, connects the first node N1 to ground, a second inductor L2 connects the node N2 to ground, and a second capacitor C2 connects the third node N3 to ground. The operation of the assembly in FIG. 2 is known per se in the art and will not be described in detail in the context of the description of the present invention. The closure duty cycle of the switch Q1 has an effect on the value of the output voltage $V_{OUT}$. By varying the frequency and the durations of the open/close phases of the signal for controlling the switch Q1, it is possible to vary the value of the output voltage. In general, the output voltage value is dependent on the closure duty cycle D of the switch Q1: $V_{OUT}=V_{IN}(D/(1-D))$. For D=0.2 and $V_{IN}$=20 V, $V_{OUT}$ is equal to 5 V. For D=0.9 and $V_{IN}$=6 V, $V_{OUT}$ is equal to 54 V. Values that are intermediate between these end values are also achievable.

Figure 3:
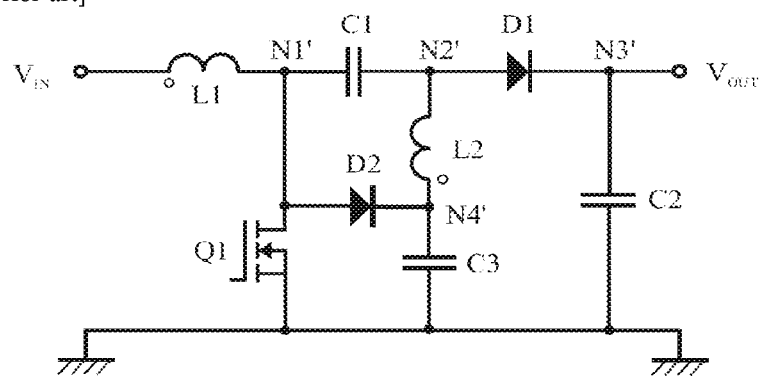
FIG. 3 shows a circuit diagram of a boosted SEPIC known from the prior art.

FIG. 3 illustrates the circuit diagram of a boosted SEPIC-type switched-mode converter known per se in the art. While the SEPIC allows the input voltage to be decreased or increased, the boosted SEPIC increases it. The corresponding assembly comprises the SEPIC assembly from FIG. 2 and the nodes N1, N2' and N3' correspond to the nodes N1, N2 and N3 in FIG. 2. The assembly comprises and further comprises a fourth node N4' that is located between the second inductor L2 and ground, a second diode D2, the anode of which is connected to the first node N1' and the cathode of which is connected to the fourth node N4', and a third capacitor C3 connecting the node N4' to ground and connected to the inductor L3. The operation of the assembly in FIG. 3 is known per se in the art and will not be described in detail in the context of the description of the present invention. The closure duty cycle of the switch Q1 has an effect on the value of the output voltage $V_{OUT}$. By varying the frequency and the durations of the open/close phases of the signal for controlling the switch Q1, it is possible to vary the value of the output voltage. In general, the output voltage value is dependent on the closure duty cycle D of the switch Q1: $V_{OUT}=V_{IN}(1+D)/(1-D)$. For D=0.2 and $V_{IN}$=20 V, $V_{OUT}$ is equal to 30 V. For D=0.9 and $V_{IN}$=6 V, $V_{OUT}$ is equal to 114 V. Values that are intermediate between these end values are also achievable.

Figure 4:
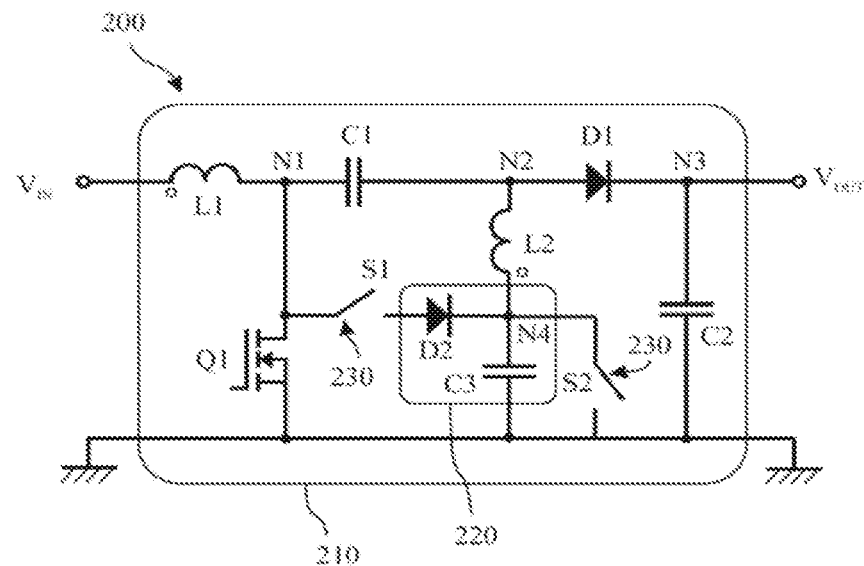
FIG. 4 shows a circuit diagram of a converter according to one preferred embodiment of the invention, incorporating a SEPIC and a boosted SEPIC.

FIG. 4 shows a second embodiment of the converter 200 according to the invention, based by way of nonlimiting example on the assemblies introduced by FIGS. 2 and 3, respectively. The converter 200 comprises a first electronic circuit 210 which forms a first SEPIC circuit as described above, capable of converting the input voltage $V_{IN}$ into an output voltage $V_{OUT}(210)$, which differs from V. The electronic components and the connection nodes N1-N3 are given by analogy with the assembly from FIG. 2. The output voltage is also dependent on the closure duty cycle of the switch Q1. The converter 200 also comprises a second set of electronic components 220, composed of the second diode D2 and of the third capacitor C3, and a selector assembly 230 comprising, nonlimitingly, two switches S1 and S2. Controlling the selector assembly make it possible to switch between using the first, SEPIC electronic circuit 210 and the second, boosted-SEPIC electronic circuit, which is formed by combining the first electronic circuit 210 with the electronic components 220. Specifically, this combining operation results in a second electronic circuit 210, 220 that corresponds to the boosted-SEPIC assembly introduced above with reference to FIG. 3.

The switch S1 of the selector assembly 230 is connected between the node N1 and the diode D2. It allows the diode D2 to be connected to/disconnected from the converter 200. The switch S2 of the selector assembly 230 is connected between the node N4, which is itself located between the inductor L2 and the capacitor C3, and ground, in parallel with the capacitor C3. It allows the terminals of the capacitor C3 to be shorted with respect to the converter 200.

When S1 is open and S2 is closed, the diode D2 is disconnected from the converter and the capacitor C3 is shorted. As such, the electronic components 220 do not form part of the converter 200, which corresponds to a first, SEPIC electronic circuit 210 and which operates as described above. When S1 is closed while S2 is open, the diode D2 is connected between the node N1 and the node N4 and the capacitor C3 is no longer shorted. As such, the electronic components 220 form a functional part of the converter 200, which corresponds in this case to a second, boosted-SEPIC electronic circuit 210, 220 and which operates as described above. By controlling the state of the selector assembly 230, the converter shown is therefore capable of combining SEPIC operation with boosted-SEPIC operation without however doubling the number of electronic components required to produce the two architectures. Returning to the nonlimiting exemplary values used above, the converter 200 is capable of generating, on the basis of an input voltage of between 6 V and 20 V, output voltages of between 5 V and 114 V.

FIG. 5 shows a driver device 20 for driving the power supply for a plurality of light sources connected as load to a converter 200 such as described above. By way of example, the light sources are illustrated as light-emitting diodes (LEDs). A control unit 250 for the driver device 20 is configured to control the selector assembly 230 of the converter 200 by means of control signals S1, S2, in accordance with the description provided above, so as to selectively switch between the first electronic circuit 210 and the second electronic circuit 210, 220, respectively. In the example illustrated, the control unit is also configured to control the chopper switch Q1 that is common to the first and second electronic circuits of the converter. Thus, the control unit, which may for example receive an LED operation setpoint from a central unit of a motor vehicle, is capable of controlling the converter 200 such that it supplies the voltage level required to meet said setpoint. Advantageously, the control unit 250 also considers intrinsic values of the light sources, for example BIN information describing the direct current required by the LEDs, as well as operating parameters, such as for example an NTC temperature value that is representative of the semiconductor junction temperature of the LEDs, on which their direct current depends. The control unit 250 may, by way of nonlimiting example, be formed by a programmed microcontroller element in order to produce the control signals Q1, S1 and S2. A person skilled in the art will be capable of formulating a program for controlling the converters 100, 200 according to the invention by referring to the functional description provided above and by using their general knowledge of this field.

The invention claimed is:

1. Converter for selectively converting an input voltage into at least a first and a second different output voltages, wherein the converter comprises a selector assembly configured to switch between using a first electronic circuit forming an un-boosted switched-mode converter and at least a second electronic circuit forming a boosted switched-mode converter, the first and second electronic circuits allowing the first and second output voltages to be supplied, respectively, wherein:
   the first electronic circuit comprises a first diode having a terminal serving as an output terminal of the converter, and
   the second electronic circuit comprises the first diode of the first electronic circuit and a second diode that is selectively connected to the converter by the selector assembly.

2. The converter according to claim 1, wherein the second electronic circuit comprises the first electronic circuit.

3. The converter according to claim 2, wherein the selector assembly comprises at least one switch.

4. The converter according to claim 2, wherein the first electronic circuit is a SEPIC (single-ended primary-inductor converter) circuit and in that the second electronic circuit is a boosted-SEPIC circuit.

5. The converter according to claim 2, wherein the first electronic circuit comprises an input terminal, a first inductor connecting the input terminal to a first node, a first capacitor, the terminals of which connect the first node to a second node, the first diode, the anode of which is connected to the second node and the cathode of which is connected to a third node, the third node being connected to an output terminal of the converter, and in that a first switch connects the first node to ground, a second inductor connects the second node to ground, and a second capacitor connects the third node to ground.

6. The converter according to claim 2, wherein the first electronic circuit is capable of generating an output voltage of between 5 and 55 V and in that the second electronic circuit is capable of generating an output voltage of between 30 and 114 V for an input voltage of between 6 and 20 V.

7. Device for driving the power supply for at least one semiconductor element-based light source, wherein the device comprises a converter according to claim 2, and a control unit that is configured to control the selector assembly of the converter according to the voltage level required to supply the light sources with power.

8. The converter according to claim 1, wherein the selector assembly comprises at least one switch.

9. The converter according to claim 8, wherein the first electronic circuit is a SEPIC (single-ended primary-inductor converter) circuit and in that the second electronic circuit is a boosted-SEPIC circuit.

10. The converter according to claim 8, wherein the first electronic circuit comprises an input terminal, a first inductor connecting the input terminal to a first node, a first capacitor, the terminals of which connect the first node to a second node, the first diode, the anode of which is connected to the second node and the cathode of which is connected to a third node, the third node being connected to an output terminal of the converter, and in that a first switch connects the first node to ground, a second inductor connects the second node to ground, and a second capacitor connects the third node to ground.

11. The converter according to claim 1, wherein the first electronic circuit is a SEPIC (single-ended primary-inductor converter) circuit and in that the second electronic circuit is a boosted-SEPIC circuit.

12. The converter according to claim 1, wherein the first electronic circuit comprises an input terminal, a first inductor connecting the input terminal to a first node, a first capacitor, the terminals of which connect the first node to a second node, the first diode, the anode of which is connected to the second node and the cathode of which is connected to a third node, the third node being connected to an output terminal of the converter, and in that a first switch connects the first node to ground, a second inductor connects the second node to ground, and a second capacitor connects the third node to ground.

13. The converter according to claim 12, wherein the first switch is a transistor, in particular a field-effect transistor, the closure duty cycle of which has an effect on the value of the output voltage of the converter.

14. The converter according to claim 1, wherein the first electronic circuit is capable of generating an output voltage of between 5 and 55 V and in that the second electronic circuit is capable of generating an output voltage of between 30 and 114 V for an input voltage of between 6 and 20 V.

15. Device for driving the power supply for at least one semiconductor element-based light source, wherein the device comprises a converter according to claim 1, and a control unit that is configured to control the selector assembly of the converter according to the voltage level required to supply the light sources with power.

16. The converter for selectively converting an input voltage into at least a first and a second different output voltages, wherein the converter comprises a selector assembly configured to switch between using a first electronic circuit forming an unboosted switched-mode converter and at least a second electronic circuit forming a boosted switched-mode converter, the first and second electronic circuits allowing the first and second output voltages to be supplied, respectively, wherein the second electronic circuit comprises at least a portion of the first electronic circuit;

wherein the first electronic circuit comprises an input terminal, a first inductor connecting the input terminal to a first node, a first capacitor, the terminals of which connect the first node to a second node, a first diode, the anode of which is connected to the second node and the cathode of which is connected to a third node, the third node being connected to an output terminal of the converter, and in that a first switch connects the first node to ground, a second inductor connects the second node to ground, and a second capacitor connects the third node to ground; and wherein the second electronic circuit comprises the first electronic circuit and further comprises a fourth node that is located between the second inductor and ground, a second diode, the anode of which is connected to the first node and the cathode of which is connected to the fourth node, and a third capacitor connecting the node to ground.

17. The converter according to claim 16, wherein the selector assembly is capable of selectively connecting and disconnecting the second diode and of selectively shorting the terminals of the third capacitor.

18. The converter according to claim 17, wherein the selector assembly comprises a first selector switch that is arranged between the first node and the anode of the second diode, and a second selector switch that is connected in parallel with the third capacitor and connects the node to ground.

19. The converter according to claim 16, wherein the selector assembly comprises a first selector switch that is arranged between the first node and the anode of the second diode, and a second selector switch that is connected in parallel with the third capacitor and connects the node to ground.

20. Converter for selectively converting an input voltage into at least a first and a second different output voltages, wherein the converter comprises a selector assembly configured to switch between using a first electronic circuit forming an unboosted switched-mode converter and at least a second electronic circuit forming a boosted switched-mode converter, the first and second electronic circuits allowing the first and second output voltages to be supplied, respectively, wherein the second electronic circuit comprises at least a portion of the first electronic circuit; wherein the first electronic circuit comprises an input terminal, a first inductor connecting the input terminal to a first node, a first capacitor, the terminals of which connect the first node to a second node, a first diode, the anode of which is connected to the second node and the cathode of which is connected to a third node, the third node being connected to an output terminal of the converter, and in that a first switch connects the first node to ground, a second inductor connects the second node to ground, and a second capacitor connects the third node to ground;

wherein the first switch is a transistor, in particular a field-effect transistor, the closure duty cycle of which has an effect on the value of the output voltage of the converter; and wherein the second electronic circuit comprises the first electronic circuit and further comprises a fourth node that is located between the second inductor and ground, a second diode, the anode of which is connected to the first node and the cathode of which is connected to the fourth node, and a third capacitor connecting the node to ground.

* * * * *